United States Patent
Lauwerys et al.

(10) Patent No.: US 7,321,816 B2
(45) Date of Patent: Jan. 22, 2008

(54) MODEL FREE SEMI-ACTIVE VEHICLE SUSPENSION SYSTEM

(75) Inventors: Christophe Lauwerys, Kessel-Lo (BE); Jan Swevers, Meldert (BE)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 322 days.

(21) Appl. No.: 11/111,832

(22) Filed: Apr. 22, 2005

(65) Prior Publication Data

US 2005/0240326 A1 Oct. 27, 2005

Related U.S. Application Data

(60) Provisional application No. 60/565,512, filed on Apr. 27, 2004.

(51) Int. Cl.
*B60G 17/015* (2006.01)
*B60G 17/018* (2006.01)
*B60G 17/08* (2006.01)

(52) U.S. Cl. .......................................... 701/37; 280/5.5
(58) Field of Classification Search ...................... None
See application file for complete search history.

(56) References Cited

U.S. PATENT DOCUMENTS

| | | | |
|---|---|---|---|
| 5,189,615 A | 2/1993 | Rubel et al. | |
| 5,452,209 A | 9/1995 | Dinkelacker et al. | |
| 6,314,353 B1 * | 11/2001 | Ohsaku et al. | 701/37 |
| 2005/0071060 A1 * | 3/2005 | Lauwerys et al. | 701/37 |

FOREIGN PATENT DOCUMENTS

| | | |
|---|---|---|
| DE | 43 02 884 | 8/1994 |
| EP | 0 341 883 | 11/1989 |
| EP | 1 018 445 | 7/2000 |
| EP | 1 060 916 | 12/2000 |
| JP | 04 321828 | 11/1992 |
| JP | 2001012106 | 1/2001 |
| WO | WO 91/00189 | * 1/1991 |

OTHER PUBLICATIONS

"Robust linear control of an active suspension on a quarter car test-rig," Christophe Lauwerys et al., Katholieke Universiteit Leuven, Division PMA, Apr. 5, 2004.

"Road Adaptive Active Suspension Design Using Linear Parameter-Varying Gain-Scheduling," Ian Fialho and Garry J. Balas, IEEE Transactions on Control Systems Technology, vol. 10, No. 1, Jan. 2002.

(Continued)

*Primary Examiner*—Michael J. Zanelli
(74) *Attorney, Agent, or Firm*—Womble Carlyle

(57) ABSTRACT

A method for controlling a shock absorber system of a vehicle that includes a plurality of controlled shock absorbers linearizes the system. The method includes transforming original control inputs of the shock absorbers into virtual damper force input signals based on a bilinear damper characteristic. The system dynamics are then decoupled into modal components using static decoupling matrices, and the system is controlled with a linear decentralized controller.

18 Claims, 10 Drawing Sheets

OTHER PUBLICATIONS

"Nonlinear Adaptive Control of Active Suspensions," Andrew Alleyne and J. Karl Hedrick, IEEE Transactions on Control Systems Technology, vol. 3, No. 1, Mar. 1995.

"Road-Adaptive Nonlinear Design of Active Suspensions," Jung-Shan Lin and Ioannis Kanellakopoulos, Proceedings of the 1997 American Control Conference, Albuquerque, NM, Jun. 1997, pp. 714-718.

"Active suspension design using linear parameter varying control," P. Gaspar, I. Szaszi and J. Bokor, Int. J. of Vehicle Autonomous Systems (IFVAS), vol. 1, No. 2, 2003.

"Linear control of car suspension using nonlinear actuator control," C. Lauwerys, J. Swevers and P. Sas, Proceedings of ISMA2002—vol. I.

* cited by examiner

MODEL FREE SEMI-ACTIVE VEHICLE SUSPENSION SYSTEM

RELATED APPLICATIONS

This application claims the benefit of U.S. Provisional Application No. 60/565,512, filed Apr. 27, 2004, the specification of which is herein incorporated by reference.

FIELD OF THE INVENTION

One embodiment of the present invention is directed to a vehicle suspension system. More particularly, one embodiment of the present invention is directed to a model free semi-active vehicle suspension system.

BACKGROUND INFORMATION

Comfort and road handling performance of a passenger car or any other vehicle are mainly determined by the damping characteristic of the shock absorbers on the vehicle. Passive shock absorbers have a fixed damping characteristic determined by their design. Depending on the road excitation, however, it is desirable to adjust this characteristic to increase performance. Semi-active and active suspension systems offer the possibility to vary the damper characteristics along with the road profile by, for example, changing the restriction of one or two current controlled valves or by changing the viscosity of a magneto rheological fluid.

An active shock absorber has the additional advantage that negative damping can be provided and that a larger range of forces can be generated at low velocities, thereby potentially allowing an increase in system performance. However, semi-active suspensions are less complex, more reliable and more commercially available than active suspensions. They do not require an external power source (e.g., a hydraulic pump) and are more safe because they can only dissipate energy and therefore cannot render the system unstable.

There exist several linear and nonlinear methods to control a car using an active or semi-active suspension. As for the known linear methods, they generally apply linear control strategies based on linear physical car models consisting of lumped masses, linear springs and dampers, and a shock absorber modeled as an ideal force source. However, real car dynamics are much more complex and active shock absorbers are not ideal force sources but have a complex nonlinear dynamic behavior. The unrealistic assumptions used by the known methods make these linear control approaches less appropriate for practical applications.

Nonlinear control methods such as linear parameter varying gain scheduling, backstepping, and adaptive control have been applied to active suspension systems. These controllers are based on a nonlinear physical car and damper model which have a large number of parameters. The experimental identification of these model parameters is a complex problem. In addition, the design and tuning of a nonlinear controller using these known methods is difficult, and therefore the use of nonlinear models and controllers lead to very time-consuming designs, since no standard techniques or software tools are available.

Lauwerys et al., "*Design and experimental validation of a linear robust controller for an active suspension of a quarter car*", Proceeding of the American Control Conference (2004), discloses a practical, experimental approach using linear identification and robust control techniques on an active suspension of a quarter car test rig. A linear robustly performing controller is obtained using μ-synthesis based on an experimentally identified linear model of both the active suspension and the quarter car dynamics. The relatively simple construction of the test rig and the linearity of the active suspension made it possible to apply linear identification and control design techniques. However, the dynamics of a real car are much more complex and a semi-active suspension behaves quite differently then an active suspension because, for example, it becomes uncontrollable when the rattle velocity is zero.

The above-described model based methods may, in theory, yield optimal controllers for certain shock absorbers and car models. However, their application to a full car and highly nonlinear semi-active shock-absorbers is complex and very difficult, if not impossible, to implement.

Based on the foregoing, there is a need for a system and method for model free control of a nonlinear semi-active or active shock absorber.

SUMMARY OF THE INVENTION

One embodiment of the present invention is a method for controlling a shock absorber system of a vehicle that includes a plurality of controlled shock absorbers. The system is linearized by transforming original control inputs of the shock absorbers into virtual damper force input signals based on a bilinear damper characteristic. The system dynamics are then decoupled into modal components using static decoupling matrices, and the system is controlled with a linear decentralized controller.

DETAILED DESCRIPTION

One embodiment of the present invention is a model free control structure that does not directly aim at optimality, but incorporates many physically interpretable parameters that can be easily tuned online according to guidelines given by test pilots and based on test results. This approach is based on physical principles of semi-active shock absorbers and cars in general, but does not require a model of its dynamics. Therefore it is applicable to any semi-active or active suspension system and any type of car or vehicle.

Figure 1:
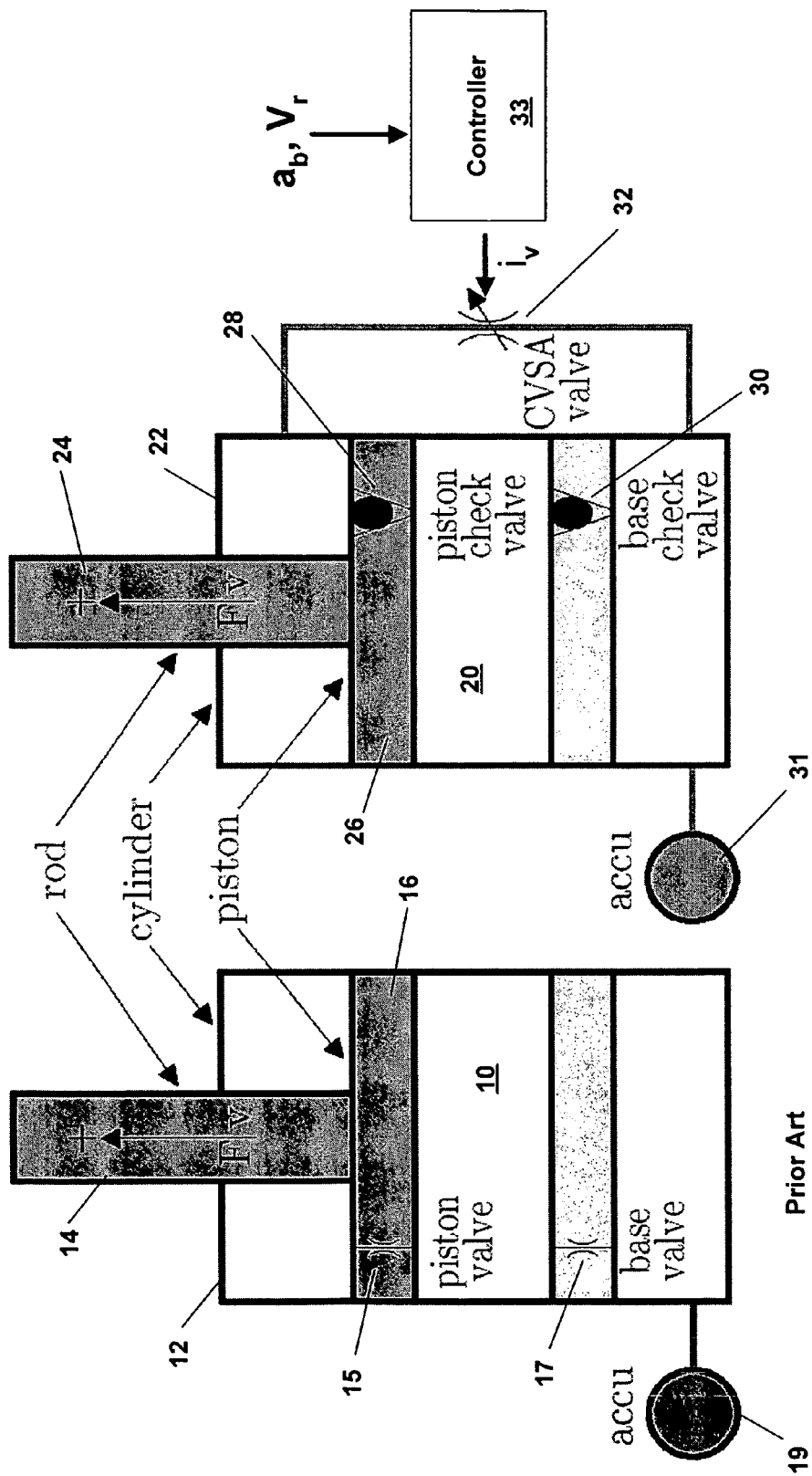
FIG. 1 is a block diagram illustrating a prior art passive shock absorber and a semi-active shock absorber in accordance with one embodiment of the present invention.

FIG. 1 is a block diagram illustrating a prior art passive shock absorber 10 and a semi-active shock absorber 20 in accordance with one embodiment of the present invention. Shock absorber 10 includes a cylinder 12 filled with oil, and a rod 14 connected to a piston 16, which includes a piston valve 15 that provides a calibrated restriction. The change in volume caused by rod 14 moving in or out of cylinder 12 is compensated for by oil flowing in or out of an accumulator 19 through a base valve 17. The pressure drop over both base valve 17 and piston valve 15 results in a damping force acting on piston 16.

Semi-active shock absorber 20 also includes a rod 24, a cylinder 22, a piston 26, and an accumulator 31. However, in semi-active shock absorber 20 the piston and base valves are each replaced by a check valve (piston check valve 28 and base check valve 30). A current controlled continually variable semi-active ("CVSA") valve 32 has an input current "$i_v$". A controller 33 generates $i_v$ as disclosed in more detail below. In one embodiment, $i_v$ is limited between $i^-=0.3$ A and $i^+=1.6$ A, which corresponds to the least and most restrictive positions of valve 32 (i.e., open and closed), respectively.

In operation, when rod 24 moves up (positive rattle velocity), piston check valve 28 closes and oil flows through CVSA valve 32. Because the volume of rod 24 inside cylinder 22 reduces, oil is forced from accumulator 31 into cylinder 22 through base check valve 30. The rattle displacement/velocity is the relative displacement/velocity of rod 24 with respect to cylinder 22.

When rod 24 moves down (negative rattle velocity), piston check valve 28 opens. Because the volume of rod 24 inside cylinder 22 increases, base check-valve 30 closes and oil flows from cylinder 22 into accumulator 31 through CVSA valve 32.

Figure 2:
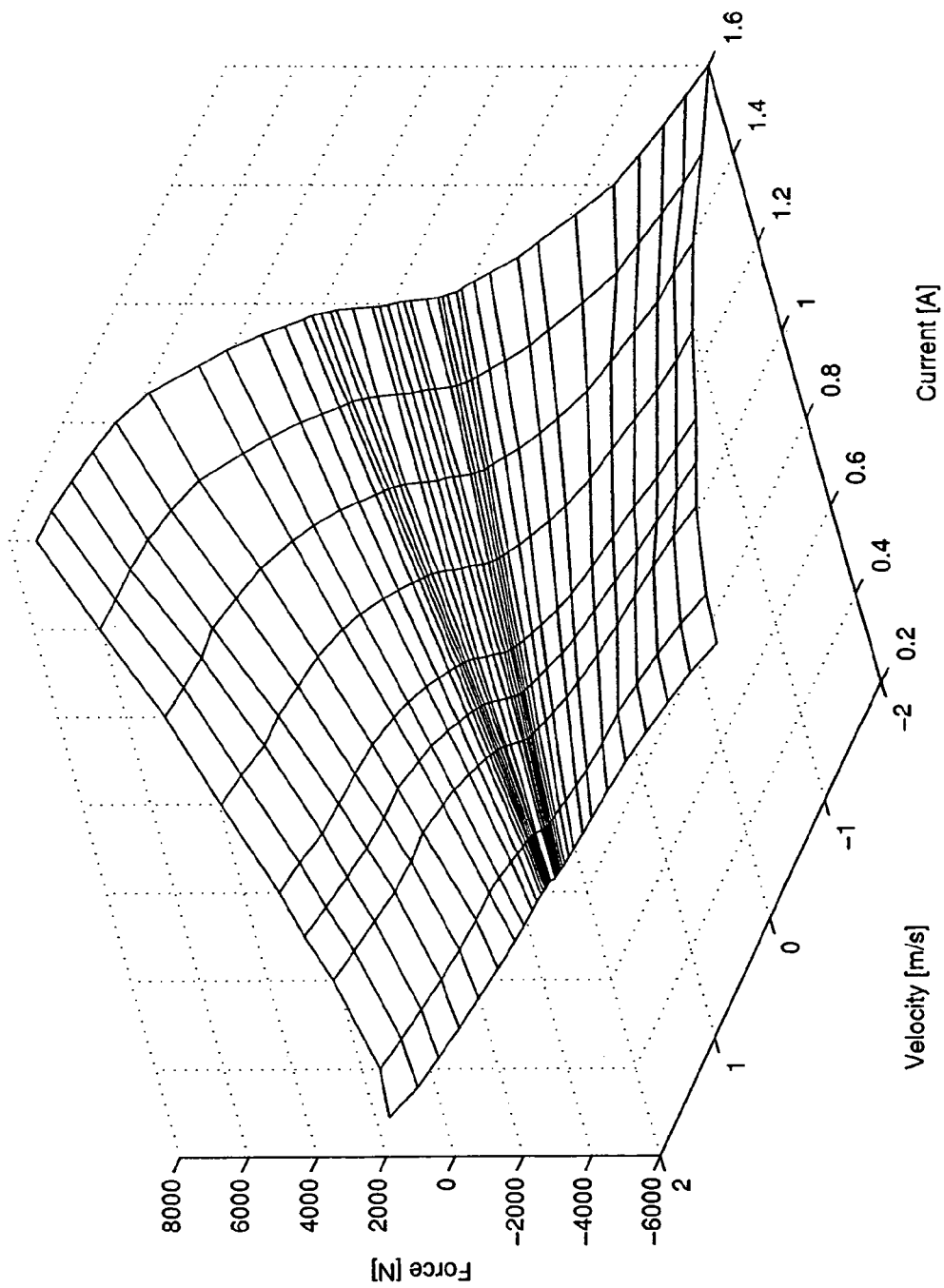
FIG. 2 is a graph illustrating a measured velocity force damping characteristic for different input currents of a CVSA valve.

FIG. 2 is a graph illustrating a measured velocity force damping characteristic for different input currents $i_v$ of CVSA valve 32. A low/high current to CVSA valve 32 corresponds to a small/large restriction yielding a low/high damping ratio. This characteristic is obtained by applying a sinusoidal rattle displacement signal for different settings of the control current to CVSA valve 32.

In one embodiment, in order to develop current parameters as disclosed below, a passenger car equipped with four semi-active shock absorbers is placed on four hydraulic shakers which are capable of independently exciting the four wheels of the car with a desired road profile. The body acceleration of the car is measured using four accelerometers. Further, the rattle displacement of all four shock absorbers is measured using linear displacement sensors. In this test setup, the disturbance inputs of the system are the displacement of the shakers under the wheels of the car. The control inputs are the currents to the four semi-active shock absorber CVSA valves. Although in the described embodiments valve 32 is controlled in current, in other embodiments, valve 32 can be controlled by different inputs such as voltage.

Feedback Linearization

One goal of feedback linearization is to transform the original control inputs of the system (the currents to the semi-active shock absorber CVSA valves) into virtual control inputs, in order to linearize the dynamic relation between these new control inputs and the outputs of the system to be controlled (the measured body accelerations). If the relation between the system inputs and outputs is linear (or sufficiently linear), control design and tuning is simplified since well known and Computer Aided Control System Design ("CACSD") supported linear control design techniques can be applied successfully.

In the prior art, the transformation includes a physical damper model and the new control input corresponds to the damper force. However, one embodiment of the present invention is an alternative transformation, using a bilinear damper model, which results in another new control input that is not the damper force, but which, however, results in a better linearization of the system.

Figure 3:
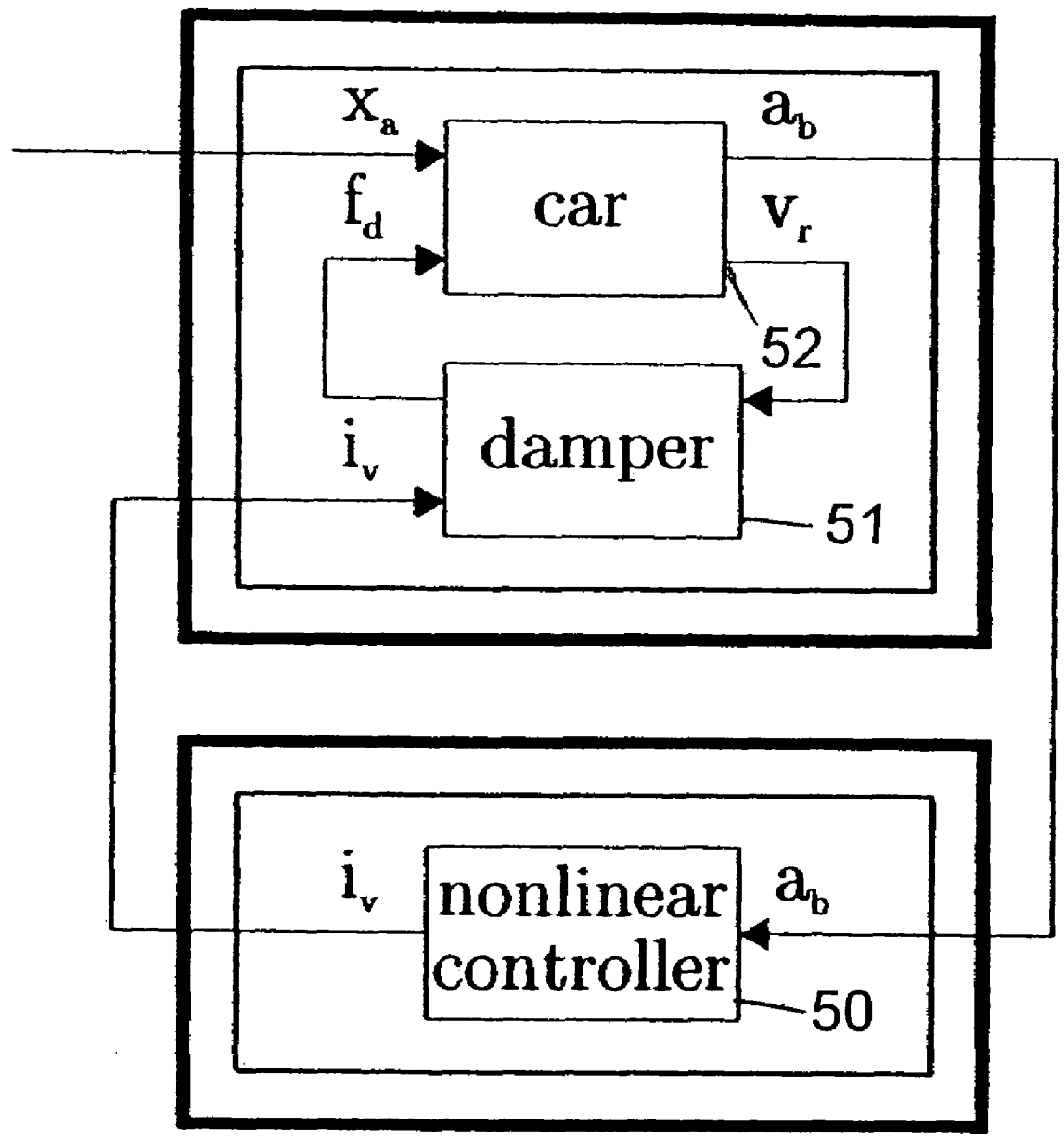
FIG. 3 is a block diagram of a car and a damper with a nonlinear controller.

Only one corner of the car needs to be considered to disclose how feedback linearization and linear control are combined by embodiments of the present invention. The shock absorber generates a force $f_d$ depending on the rattle velocity $v_r$ and the damper valve current $i_v$. The disturbance input is the road displacement $x_a$. The measured output is the body acceleration $a_b$. FIG. 3 is a block diagram of a car 52 and damper 51 with a nonlinear controller 50. To control the body of car 52 (i.e., to reduce the body acceleration), a nonlinear controller 50 feeds back the body acceleration $a_b$, to the damper control current $i_v$.

Figure 4:
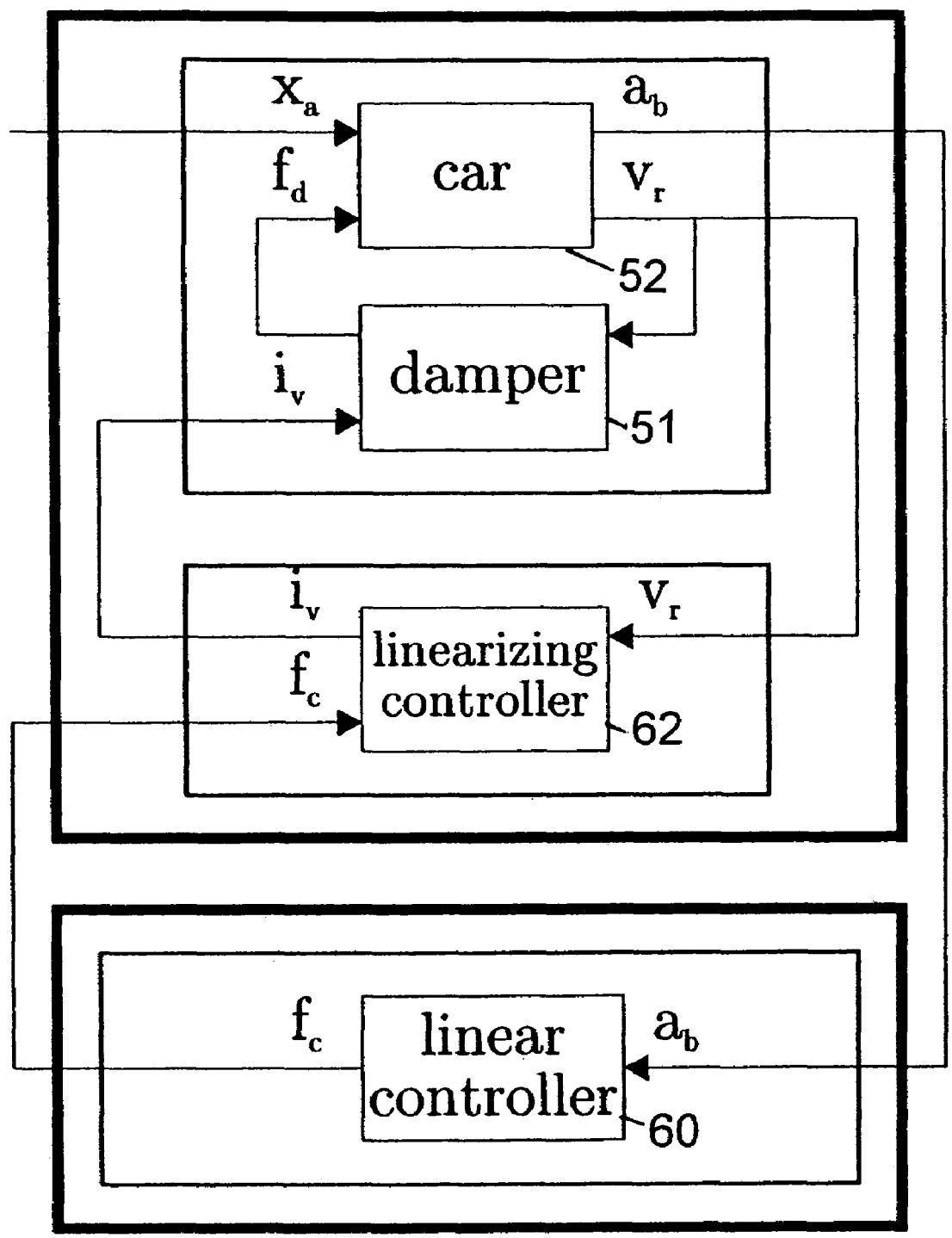
FIG. 4 is a block diagram illustrating the addition of a linear controller and a linearizing controller instead of the nonlinear controller.

The design and tuning of such a nonlinear controller 50 is not straightforward. Since the semi-active shock absorber is the most nonlinear element of the system, a linearizing controller is introduced, which calculates an appropriate damper current $i_v$, such that a desired damper force $f_c$ is realized for the given rattle velocity $v_r$. FIG. 4 is a block diagram illustrating the addition of linear controller 60 and linearizing controller 62 instead of the nonlinear controller. The desired damper force $f_c$ is generated using linear controller 60 based on the measured body acceleration $a_b$. Linearizing controller 62 is based on an inverse damper characteristic. Two different characteristics are considered: the measured velocity-force characteristic as shown in FIG. 2, which represents a simplified physical damper model, and an analytically derived bilinear characteristic.

The prior art method of feedback linearization is to base linearizing controller 62 on a physical model shock absorber or damper. Using this method, the physical model can be a simplified 2D-lookup table, such as shown in FIG. 2, which relates the damper force $f_d$ to the control current $i_v$ and the rattle velocity $v_r$. The inverse model is then obtained by using 2D interpolation techniques such that the damper current $i_v$ can be calculated from the rattle velocity $v_r$ and the desired damper force $f_c$.

In contrast to the prior art, embodiments of the present invention base linearizing controller 62 on bilinear damper characteristics. Specifically, a semi-active shock absorber is a device that delivers a force $f_c$ related to the rattle velocity $v_r$ and the control signal $i_v$ (equation 1). A bilinear approximation of this relation (equation 2) can be simplified (equation 3) by setting coefficients $F_0$ and $F_{10}$ to 0 since a semi-active shock absorber cannot deliver any force when the rod is not moving ($v_r=0$). Equations 4 and 5 show the forward and inverse damper model similarity relations. Based on this bilinear approximation, the damper force is linearly related to the product of the rattle velocity and the biased control signal.

$$f_c = F(v_r, i_v) \tag{1}$$

$$f_c = F_0 + v_r F_{01} + i_v F_{10} + v_r i_v F_{11} \tag{2}$$

$$f_c = v_r F_{11}\left(\frac{F_{01}}{F_{11}} + i_v\right) \tag{3}$$

$$f_c \sim v_r(i_0 + i_v) \tag{4}$$

$$i_v \sim \frac{f_c}{v_r} - i_0 \tag{5}$$

Since a scaling is a linear operation that is compensated for by the linear controller, a new input $f_c$ can be created which is equal to the product of the rattle velocity $v_r$ and the biased control current $i_v + i_0$. This input no longer has the physical dimension of a damper force. Therefore it is called a virtual damper force. Note that this linearizing controller contains only one parameter $i_0$, the control current bias, around which the controller will operate.

To check and compare the performance of the prior art linearizing controller based on the physical damper model with an embodiment of the present invention, in which the linearizing controller is based on bilinear damper characteristics, a test car was placed on the dynamic shakers and excited with the following signals:
Uncorrelated pink noise road profile displacement signals to the four shakers under the wheels of the car.
Uncorrelated white noise currents to the four CVSA valves of the semi-active shock absorbers.

The following signals where measured:
The four accelerometer signals on the four corners of the car.
The four rattle displacements of the four shock absorbers.

The four (virtual) damper forces were calculated offline based on the physical and the bilinear damper models.

It should be noted that the performance of the damper models is not validated by comparing the real (measured) and the calculated (virtual) damper forces, since reproduction of this force is not required by embodiments of the present invention, and since the bilinear model produces a virtual damper force which no longer has this physical meaning since it has been scaled and offset. Instead, embodiments of the present invention calculate a signal that is more linearly related to the body acceleration then the original control signal.

Figure 5:
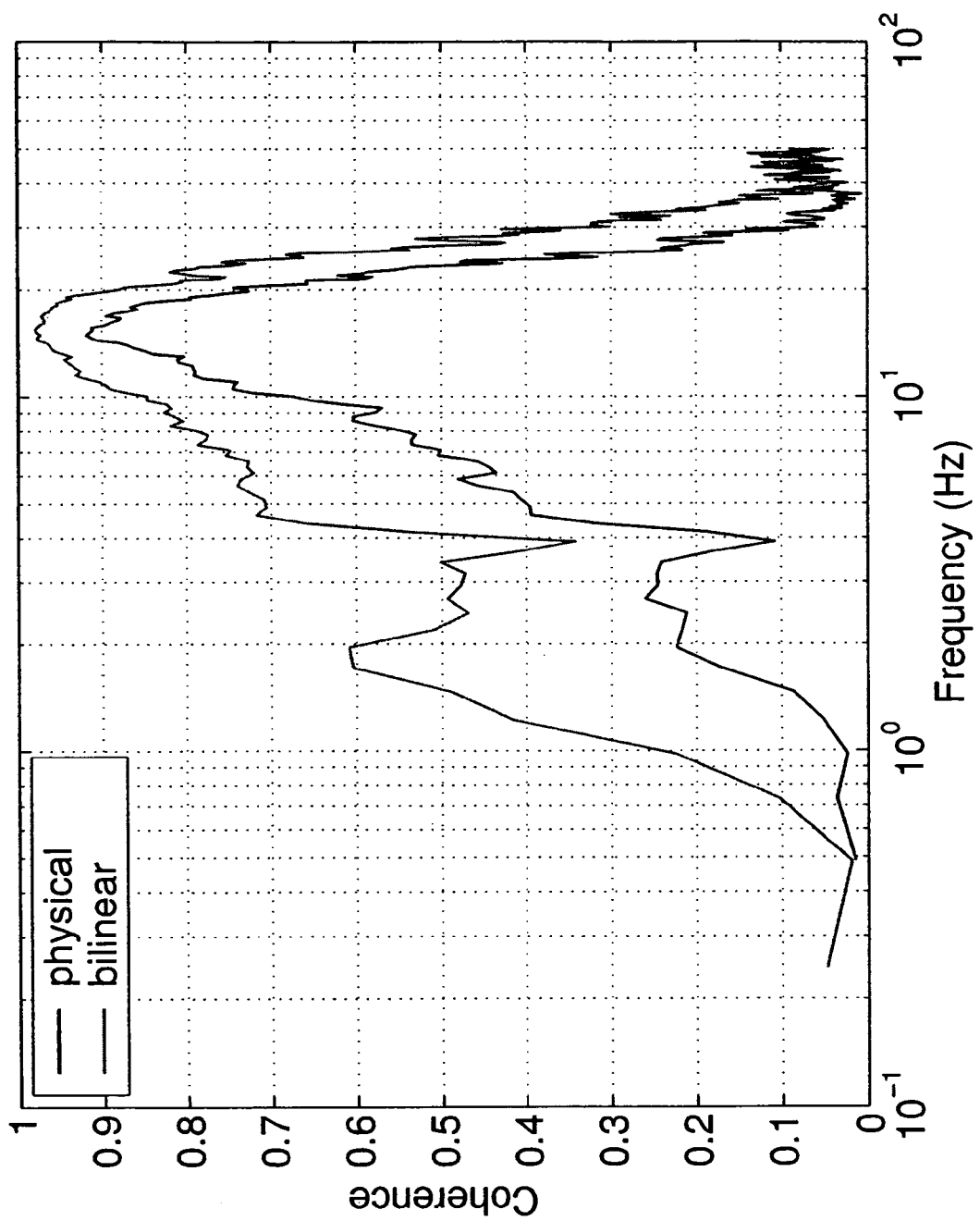
FIG. 5 graphically illustrates the multiple coherence between the calculated damper forces, based on the physical and the bilinear model, and the body acceleration measured on one of the corners of the car.

FIG. 5 graphically illustrates the multiple coherence between the calculated damper forces, based on the physical and the bilinear model, and the body acceleration measured on one of the corners of the car. The coherence obtained with the bilinear model in accordance with an embodiment of the present invention is higher, therefore indicating a more linear dynamic behavior, than the one obtained with the prior art physical damper model.

One problem with the physical damper model is that it tries to compensate for the nonlinear current-velocity-force characteristics of the shock-absorber, which is much more complex then the lookup table shown in FIG. 2. The lookup table of FIG. 2 was generated with specific harmonic excitation signals for a range of fixed current settings. However, the response of a nonlinear system can be amplitude dependant. Therefore, the model is only valid for excitation signals with similar amplitude levels to the ones that were used for its identification. In contrast, the bilinear model in accordance with embodiments of the present invention does not include these nonlinear characteristics but implements a bilinear approximation which turns out to be more linearizing for broadband excitation signals, such as stochastic road excitations. The bilinear damper model includes only one parameter, "$i_0$", while the lookup table damper model consists of a large amount of data points to describe the nonlinear characteristics of the damper.

Modal Decoupling

Figure 6:
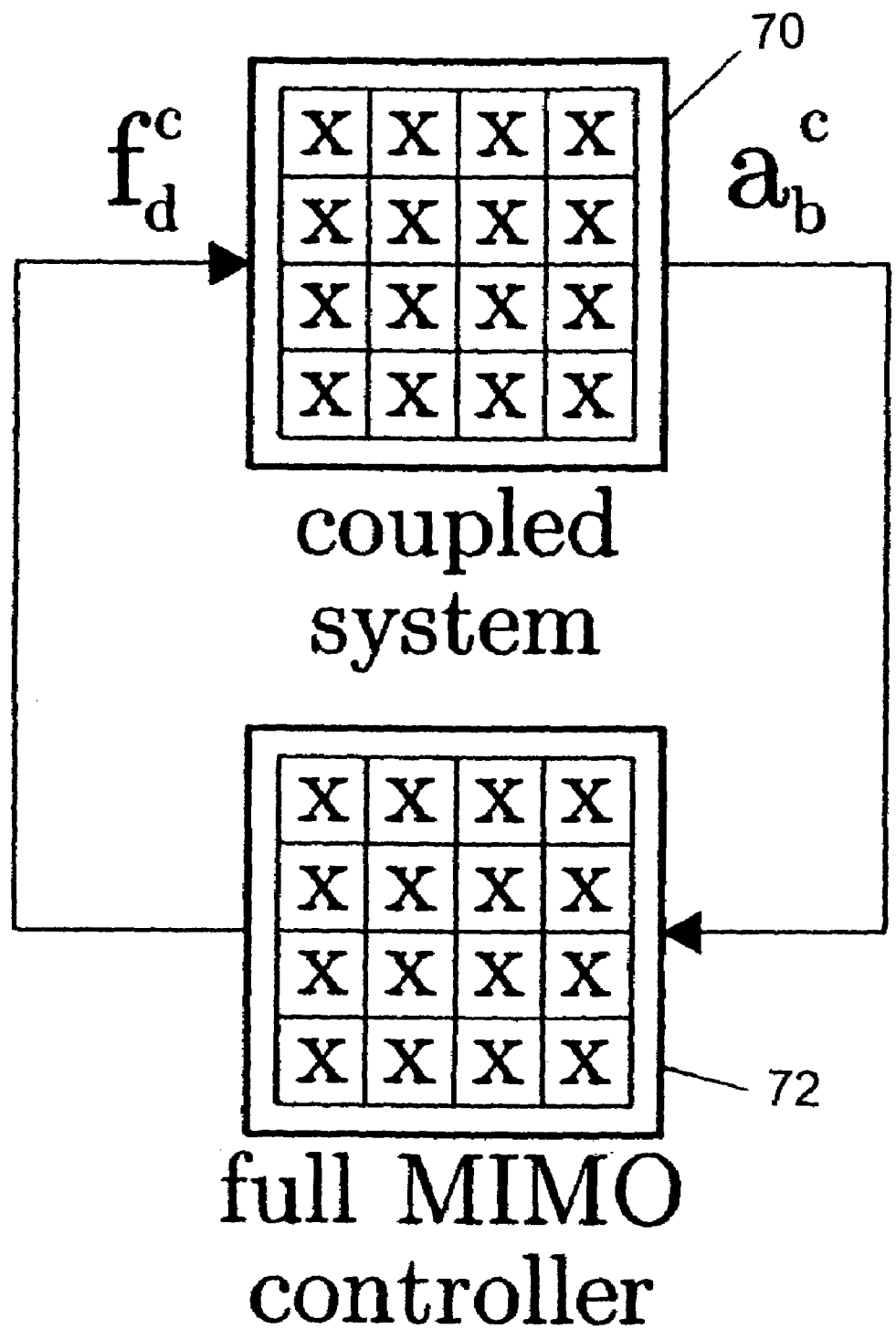
FIG. 6 is a block diagram of the passenger car with four semi-active shock absorbers in accordance with embodiments of the present invention and shown as a four-by-four multiple-input multiple-output system which requires a four-by-four MIMO controller.

FIG. 6 is a block diagram of the passenger car with four semi-active shock absorbers in accordance with embodiments of the present invention described above and shown as a four-by-four multiple-input multiple-output ("MIMO") system 70 which requires a four-by-four MIMO controller 72. The control inputs of the system (i.e., the outputs of controller 72) are the virtual forces of the semi-active shock-absorbers $f^c_d$. The measured outputs of the system (i.e., the inputs of controller 72) are the body accelerations at the four corners of the car $a^c_b$. In other embodiments of the invention, the measured outputs of the system are the body accelerations at three corners of the car instead of all four corners, and the fourth corner is calculated based on the three measured outputs.

Figure 7:
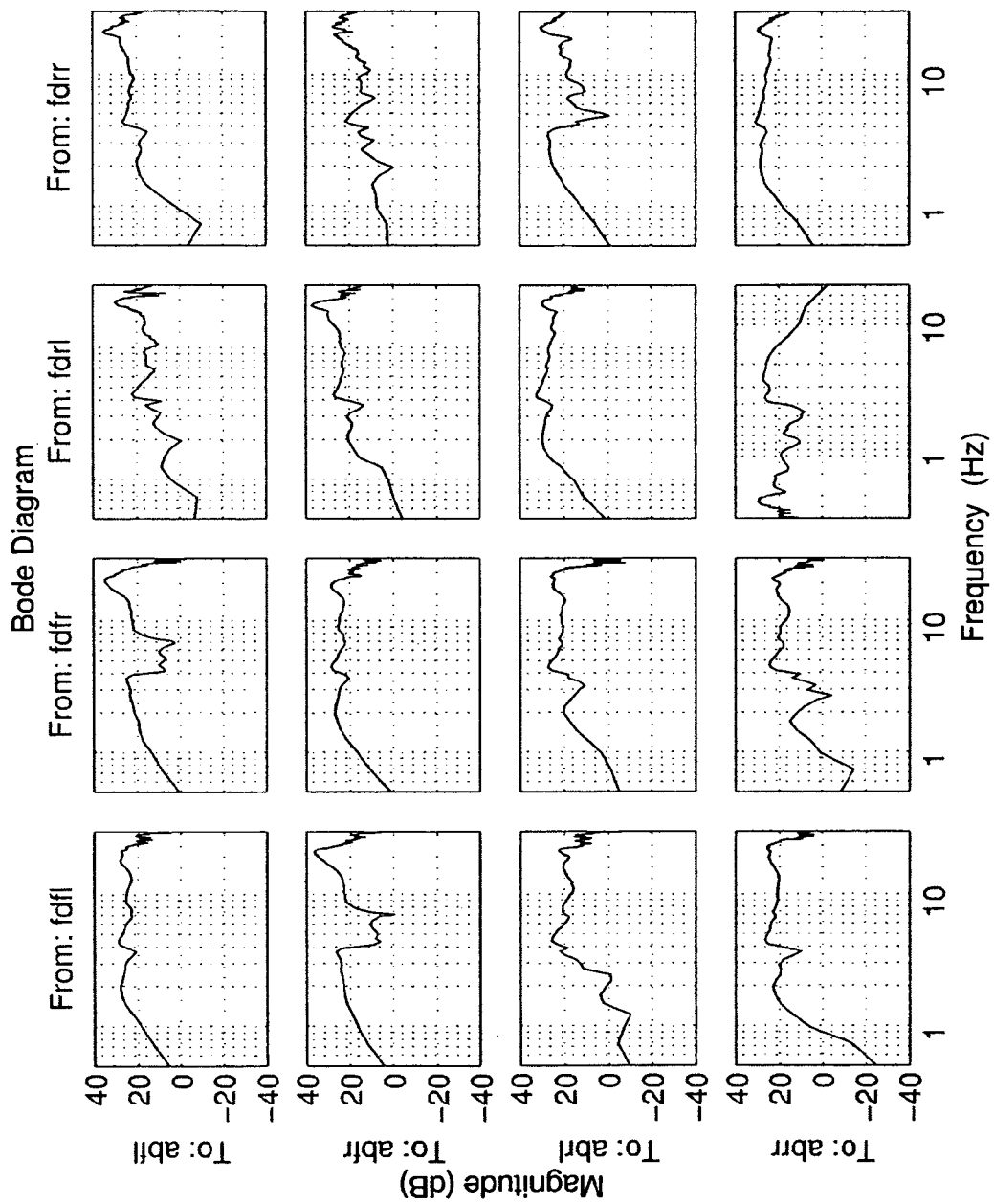
FIG. 7 graphically illustrates the measured frequency response function matrix of the system of FIG. 6.

FIG. 7 graphically illustrates the measured frequency response function ("FRF") matrix of the system of FIG. 6. FIG. 7 is an FRF matrix of the four-by-four coupled system from the virtual forces (fd) to the body accelerations (ab) at the four corners of the car (fl:front-left, fr:front-right, rl:rear-left, rr:rear-right). The relatively large magnitude of the off-diagonal elements with respect to the diagonal elements indicates a strong coupling.

Figure 8:
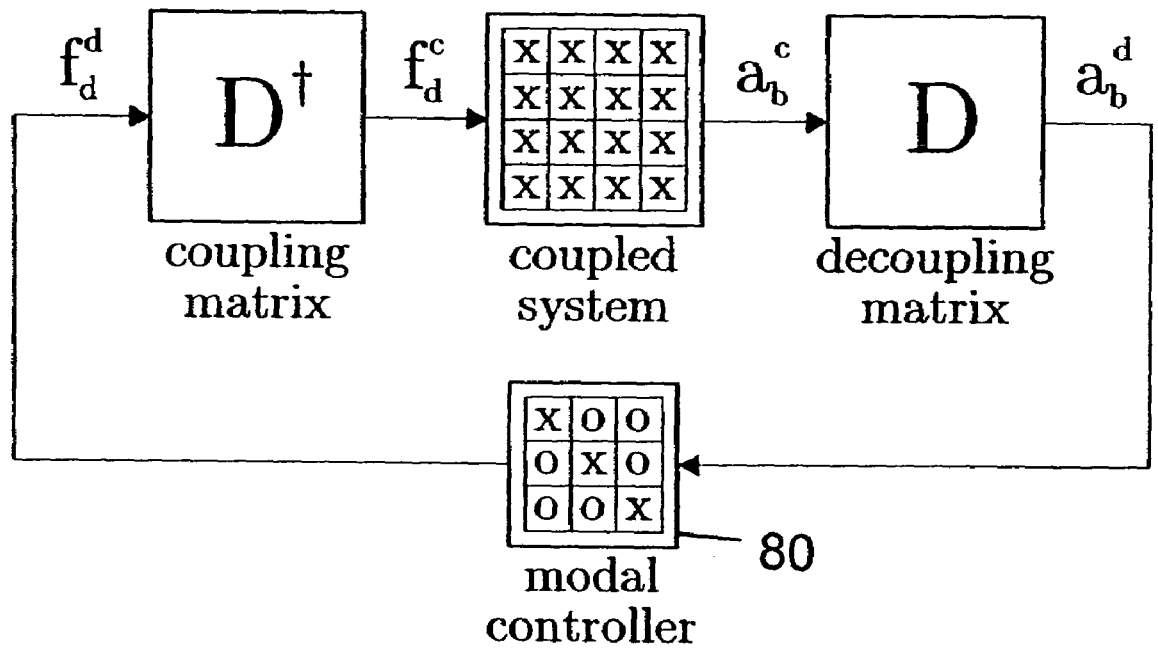
FIG. 8 is a block diagram of a modal controller and a coupled system.

A static decoupling matrix D (equation 6) and its pseudo-inverse $D^\dagger$ are used to decouple the system into its modal motions heave, roll and pitch, which are then controlled by a modal (diagonal) controller 80, shown in FIG. 8. The transformed control inputs of the system (outputs of controller 80) are three virtual modal forces acting on the car through the four semi-active shock-absorbers $f^d_d$. The transformed outputs of the system (inputs of controller 80) are the three modal motions of the car $a^d_b$.

$$D = \begin{pmatrix} +1 & +1 & +1 & +\delta & +1 & +\delta \\ +1 & -1 & +1 & +\delta & -1 & -\delta \\ +1 & +1 & -1 & -\delta & -1 & -\delta \end{pmatrix} \tag{6}$$

A perfectly symmetric car would be decoupled by the transformation matrices D and $D^\dagger$ with $\delta=0$. The columns of this matrix correspond to a location of the sensors on the car: front-left, front-right, rear-left and rear-right. The rows represent the modal motions: heave (all in phase), roll (left in anti-phase with right), pitch (front in anti-phase with rear).

Figure 9:
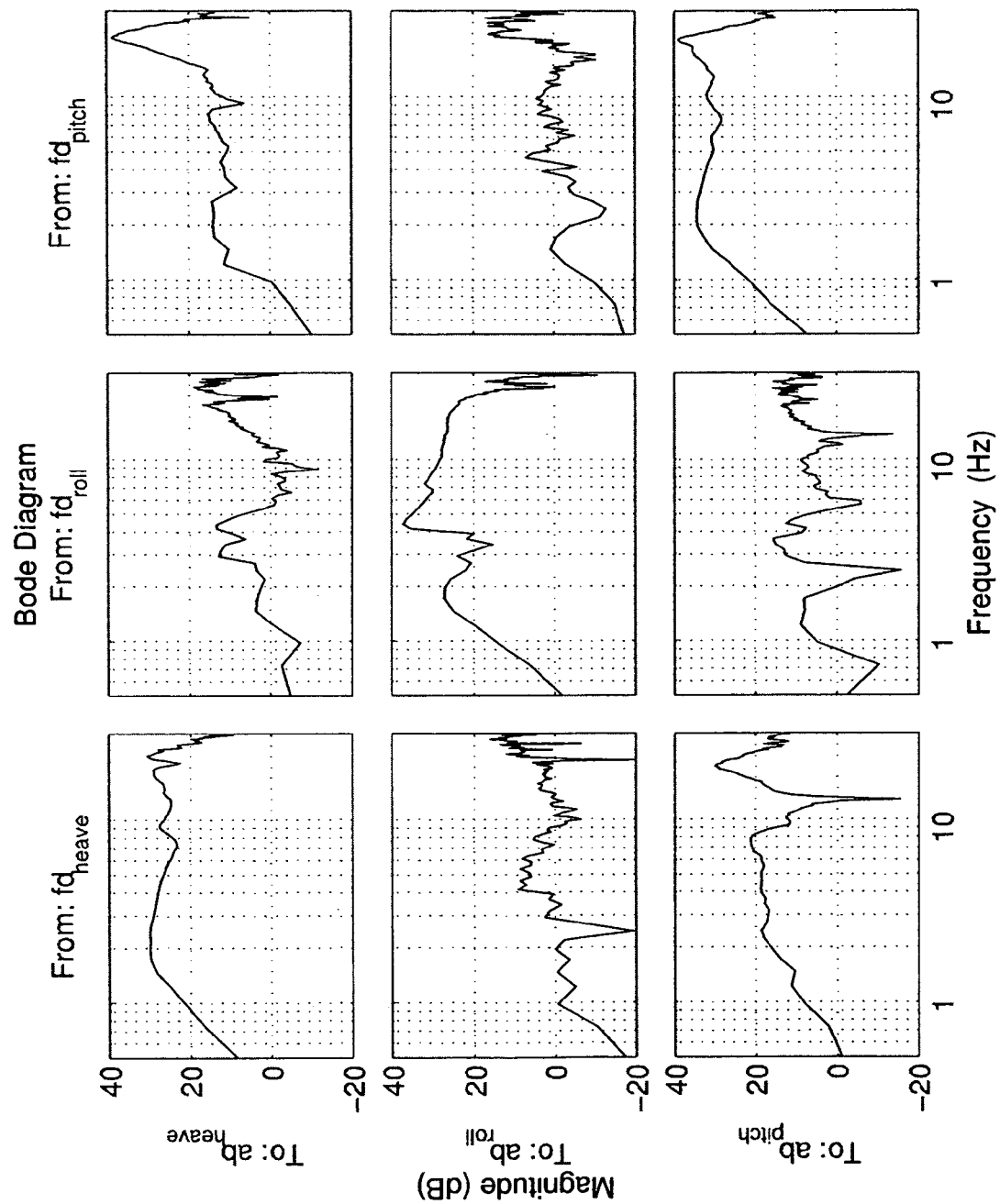
FIG. 9 graphically illustrates the measured frequency response function matrix of the system of FIG. 7.

FIG. 9 graphically illustrates the measured FRF matrix of this decoupled system, with $\delta=0$. FIG. 9 is the FRF matrix of the three-by-three decoupled system from the virtual modal forces (fd) to the modal body accelerations (ab). The relative magnitude of the off-diagonal elements is significantly smaller indicating less coupling allowing decentralized control. Based on the FRF matrices in FIGS. 7 and 9 it is not possible to conclude whether values for $\delta \neq 0$ would lead to more optimal decoupling for control. Therefore $\delta$ is introduced as a control parameter that can be tuned online in order to achieve symmetric car dynamics as a result of the longitudinally eccentricity of the center of gravity.

Control Strategies

Now that the system has been linearized and decoupled, as described above, a controller can now be designed based on the transformed system. In one embodiment, the controller is designed using the known skyhook principle. However, any other controller design principle can used that incorporates the linearized and decoupled system in accordance with embodiments of the present invention.

The linear controller in one embodiment consists of several feedback and feedforward modules, each tackling a specific comfort or handling issue. The output of all modules are summed to a desired modal virtual damper force. The goal is to suppress the modal motions of the car to increase the passengers' comfort. The feedback linearization controller and modal decoupling transformations allow to directly specify desired modal forces, to be delivered by the shock-absorbers, from measured modal motions. Based on the skyhook principle the diagonal modal controllers consist of three first order low pass filters of which the bandwidth $f_b$ and gain can be tuned online to meet an optimal trade-off between desired comfort specifications and input saturation.

Wheel hop is a resonance mode where the wheels of the car move with large amplitude with respect to the road while the car body remains relatively still. This phenomenon deteriorates the handling performance of the car because of the large tire contact force variations. The wheel hop mode can be damped by increasing the control current bias $i_0$ (see Equation 5 above) around which the control currents are varied.

When driving the car in a turn, it will roll because of the centrifugal force, which is proportional to the driving velocity squared and the curvature of the turn. This roll motion is compensated for by using a feedforward controller, which adds a modal roll force to the desired damper forces, opposite to the roll motion caused by the turn and proportional to the measured driving velocity squared and the steering angle.

When accelerating or braking, the car will pitch respectively backward and forward, proportional to the imposed lateral acceleration. This pitch motion is compensated for by using a feedforward controller, which adds a modal pitch force to the desired damper forces. This additional desired pitch force is proportional to the measured breaking force and the desired wheel torque (both available on the controller area network ("CAN") bus of the car.

Control Parameter Tuning

In one embodiment, no model is available to tune the controller (e.g., in simulation). The translation of subjective issues like comfort and road handling into classical control specifications (e.g., bandwidth and settling time), is very difficult and ambiguous. Therefore, one embodiment of the developed controller is equipped with a number of parameters that can be tuned separately online, based on comments provided by an experienced test pilot driving the car over calibrated test tracks. All tunable parameters have a physical interpretation such that their effect on the total behavior of the suspension is clear. The following discusses the different control parameters, their physical interpretation and their effect on the behavior of the car.

The modal decoupling matrix D contains one parameter 6 representing the longitudinal offset of the center of gravity. This parameter is tuned in order to get a balanced car response where the front and rear dynamics behave similarly.

The integral feedback controller, which consists of three first-order low pass filters, contains six parameters: three gains and three bandwidths. Increasing these gains and bandwidths improves the low-frequency attenuation of the modal motions of the car up to a certain point where they also start to deteriorate the high-frequency harshness.

The bilinear damper model used to linearize the system dynamics includes the rattle velocity to calculate the control currents based on the desired virtual damper force. Therefore the measured rattle displacement is differentiated and filtered with a low-pass filter in order to prevent high-frequency noise amplification. The bandwidth of this filter is an important parameter which is tuned to optimize the trade-off between controller bandwidth and noise sensitivity.

The control current bias $i_0$ (see Equation 5 above) determines the average amount of damping in the system and is mainly tuned to optimize the handling performance of the car. Increasing this value provides the car with a better tire force contact but deteriorates the passengers comfort. Experimental tuning showed that the optimal value depends on the type of road: a smooth road allows for a soft setting while a rough road requires a harder setting.

The control current bias $i_0$ resulting in the optimal compromise between comfort and road handling depends on the roughness of the road. The goal is to limit the tire contact force variations in order to maintain a certain amount of handling performance, independently of the road input. Since these tire contact forces cannot be measured online, it is assumed that the average amount of kinetic energy of the wheels is related to the average amount of tire contact force variation. The absolute wheel velocity can be approximated by the rattle velocity, since at wheel hop resonance, the body of the car remains relatively still with respect to the wheels. This leads to the following adaptive control law to maintain constant handling performance: adapt the control current bias $i_0$ such that the mean amount of kinetic energy of the wheels remains constant.

A measure E proportional to the (moving) average amount of kinetic energy of the wheels is calculated online by filtering the sum (of all four wheels) of the rattle velocities $v_r$ squared with a first order low-pass filter. The time-constant τ of this filter determines the time over which the average is calculated, as shown in Equation 7.

$$E(t) = \frac{1}{\tau s + 1}\left(\sum v_r^2\right) \quad (7)$$

For a certain type of road and a fixed value of the control current bias $i_0$, a time constant τ exists for which the average amount of kinetic energy of the wheels E converges to a constant value (within given bounds). Increasing $i_0$, resulting in a harder shock absorber, will decrease E. The car, seen as a system G with control input $i_0$ and measured output E, can be modeled as a first order system with time constant τ and a negative DC-gain A, as shown in equation 8 below. A proportional feedback controller P results in a new first order system with a time-constant $$\tau_c = \frac{\tau}{1 + PA}$$

and a DC-gain $$A_c = \frac{PA}{1+PA}.$$

Figure 10:
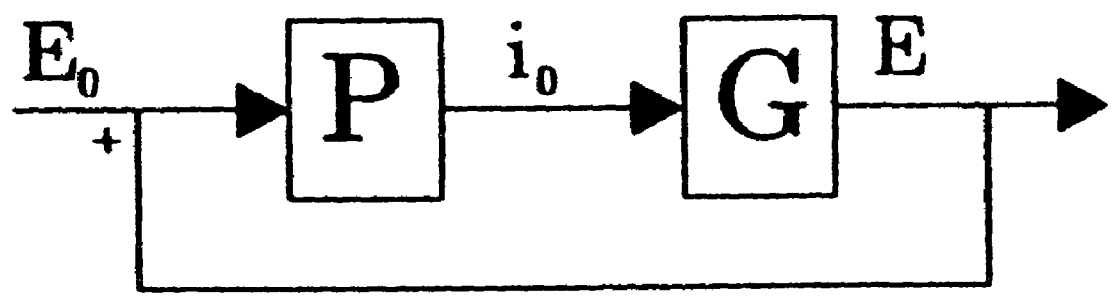
FIG. 10 is a block diagram of an adaptive controller.

FIG. 10 is a block diagram of the adaptive controller to keep the averaged kinetic energy of the wheels E, related to the averaged tire contract force variation, at a constant level $E_0$ by controlling the current bias $i_o$ with a proportional controller. The parameter P and the reference $E_0$ can be tuned to obtain a desired amount of road-independent handling performance.

$$G = \frac{A}{\tau s + 1} \quad (8)$$

As described, the controller structure in accordance with one embodiment of the present invention is derived based on physical insight of car and semi-active suspension dynamics without explicitly using a model. In one embodiment, the control structure consists of three basic parts. First the system is linearized by transforming the original current control inputs to virtual damper force input signals. It is shown that this linearization is improved if a bilinear damper characteristic is used instead of a nonlinear characteristic based on a physical model. Then the system dynamics are decoupled into their modal components using static decoupling matrices. Although the actual car dynamics are not symmetric nor statically decouplable, the off-diagonal elements of the FRF-matrix are sufficiently small with respect to the diagonal elements after static decoupling.

A single parameter is used to fine tune the longitudinal offset of the center of gravity in order to achieve symmetric car dynamics. Finally, this linearized and decoupled system is controlled by a linear decentralized controller, which consists of several modules that all tackle a specific comfort or handling issue. All parameters resulting from this model free control structure have physical meaning and therefore can be intuitively tuned online based on comments of a test-pilot. Because the optimal average damping of the system depends on the roughness of the road excitation, an adaptive controller is used to regulate the control current bias.

For the resultant semi-active suspension system in accordance with an embodiment of the present invention, the damping force of each damper can be adjusted, for instance by changing a restriction inside the damper, or by changing the characteristics of the oil inside the damper. A computer is used to calculate at each moment in time a desired damping level for each damper on the car. Embodiments of the present invention calculate these desired damping levels by taking into account the movements of the car body, road conditions and driver inputs. In contrast to prior art systems, the algorithm of embodiments of the present invention uses no physical information about the dampers, nor the car itself.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of controlling a shock absorber system of a vehicle comprising a plurality of controlled shock absorbers, said method comprising:
    linearizing the system by transforming original control inputs of the shock absorbers into virtual damper force input signals based on a bilinear damper characteristic;
    decoupling system dynamics into modal components using static decoupling matrices that comprise the virtual damper force input signals to modal body accelerations of the vehicle; and
    controlling the system with a linear decentralized controller based on the modal components.

2. The method of claim 1, wherein the system is linearized using model free inputs.

3. The method of claim 1, the modal components comprising a modal decoupling matrix that has a parameter representing a longitudinal offset of a center of gravity of the vehicle.

4. The method of claim 1, wherein the system is controlled by generating a control signal, $i_v$, for each of the controlled shock absorbers, wherein $$i_v \sim \frac{f_c}{v_r} - i_0$$

and wherein $v_r$ is a rattle velocity of the shock absorber, $f_c$ is a related force of the shock absorber, and $i_o$ is a control current bias.

5. The method of claim 1, wherein the shock absorbers are semi-active shock absorbers.

6. The method of claim 1, wherein the shock absorbers are current controlled shock absorbers.

7. A semi-active shock absorber of a shock absorber system of a vehicle comprising:
    a cylinder;
    a rod inserted within said cylinder;
    a piston coupled to said rod;
    a controlled valve coupled to said cylinder; and
    a controller coupled to said controlled valve for controlling said valve, said controller comprising:
        a linear controller;
        a linearizing controller coupled to said linear controller, said linearizing controller based on a bilinear damper characteristic.

8. The semi-active shock absorber of claim 7, wherein said controller controls said valve using a virtual damper force input signal, $i_v$, and wherein $$i_v \sim \frac{f_c}{v_r} - i_0,$$

wherein $v_r$ is a rattle velocity of the shock absorber, $f_c$ is a related force of the shock absorber, and $i_o$ is a control current bias.

9. The semi-active shock absorber of claim 7, said controller further comprising a modal decoupling matrix.

10. The semi-active shock absorber of claim 9, said modal decoupling matrix comprising a parameter representing a longitudinal offset of a center of gravity of the vehicle.

11. The semi-active shock absorber of claim 7, wherein said controlled valve is a current controlled valve.

12. The semi-active shock absorber of claim 7, wherein said controller is based on a skyhook principle.

13. A shock absorber system of a vehicle comprising a plurality of controlled shock absorbers, said system comprising:
- means for linearizing the system by transforming control inputs of the shock absorbers into virtual damper force input signals based on a bilinear damper characteristic;
- means for decoupling system dynamics into modal components using static decoupling matrices that comprise the virtual damper force input signals to modal body accelerations of the vehicle; and
- means for controlling the system with a linear decentralized controller based on the modal components.

14. The shock absorber system of claim 13, wherein the system is linearized using model free inputs.

15. The shock absorber system of claim 13, the modal components comprising a modal decoupling matrix that has a parameter representing a longitudinal offset of a center of gravity of the vehicle.

16. The shock absorber system of claim 13, wherein the system is controlled by generating a control signal, $i_v$, for each of the controlled shock absorbers, wherein $$i_v \sim \frac{f_c}{v_r} - i_0$$

and wherein $v_r$ is a rattle velocity of the shock absorber, $f_c$ is a related force of the shock absorber, and $i_o$ is a control current bias.

17. The shock absorber system of claim 13, wherein the shock absorbers are semi-active shock absorbers.

18. The shock absorber system of claim 13, wherein the shock absorbers are current controlled shock absorbers.

* * * * *